(12) United States Patent  (10) Patent No.: US 6,549,866 B1
Bhatnagar  (45) Date of Patent: Apr. 15, 2003

(54) DIGITAL ELECTRONIC CONTROL UNIT (75) Inventor: Rajiv Bhatnagar, Mumbai (IN)

(73) Assignee: Vasu Tech Limited, New Delhi (IN)

( * ) Notice: Subject to any disclaimer, the term of this patent is extended or adjusted under 35 U.S.C. 154(b) by 0 days.

(21) Appl. No.: 09/626,578

(22) Filed: Jul. 27, 2000

Related U.S. Application Data (63) Continuation-in-part of application No. PCT/IN99/00029, filed on Jul. 5, 1999, and a continuation-in-part of application No. PCT/IN99/00031, filed on Jul. 16, 1999.

(51) Int. Cl.[7] ............................................. G01D 18/00
(52) U.S. Cl. ...................................... 702/86; 236/78 R
(58) Field of Search ....................... 236/78 R; 364/200; 367/122; 434/236; 210/743; 395/550; 455/553; 702/86

(56) References Cited

U.S. PATENT DOCUMENTS

| | | | |
|---|---|---|---|
| 3,666,973 A | 5/1972 | Hulsman, Jr. | |
| 4,119,835 A | 10/1978 | Coulmance et al. | |
| 4,137,770 A | 2/1979 | Trout | |
| 4,200,910 A | 4/1980 | Hall | |
| 4,257,238 A | 3/1981 | Kountz et al. | |
| 4,290,481 A | 9/1981 | Pohl | |
| 4,298,946 A | 11/1981 | Hartsell et al. | |
| 4,469,274 A | 9/1984 | Levine | |
| 4,504,010 A | 3/1985 | Sukimoto et al. | |
| 4,631,662 A | * 12/1986 | Stutler et al. ................ 364/200 |
| 4,638,850 A | 1/1987 | Newell, III et al. | |
| 4,985,874 A | * 1/1991 | Roeschlein ................ 367/122 |
| 5,205,132 A | 4/1993 | Fu | |
| 5,215,468 A | * 6/1993 | Lauffer et al. .............. 434/236 |
| 5,216,896 A | 6/1993 | Uchida et al. | |
| 5,329,991 A | 7/1994 | Mehta et al. | |
| 5,329,992 A | 7/1994 | Tripp | |
| 5,377,128 A | 12/1994 | McBean | |
| 5,422,014 A | * 6/1995 | Allen et al. ................. 210/743 |
| 5,551,016 A | * 8/1996 | Loeb et al. ................. 395/550 |
| 5,619,614 A | 4/1997 | Payne et al. | |
| 5,647,231 A | 7/1997 | Payne et al. | |
| 5,991,639 A | * 11/1999 | Rautiola et al. ............ 455/553 |
| 6,006,996 A | * 12/1999 | Bhatnagar .................... 236/78 |

FOREIGN PATENT DOCUMENTS

| | | |
|---|---|---|
| DE | 3038814 A1 | 10/1980 |
| EP | 0 642 214 A1 | 3/1995 |
| WO | WO 96/21282 | 12/1995 |
| WO | WO/99/60456 | 11/1999 |
| WO | WO 01/02924 A1 | 1/2001 |
| WO | WO 01/06335 A1 | 1/2001 |

* cited by examiner

*Primary Examiner*—John Barlow
*Assistant Examiner*—Xiuquin Sun
(74) *Attorney, Agent, or Firm*—Needle & Rosenberg, PC.

(57) ABSTRACT

A digital electronic control unit that provides an efficient, miniature, reliable and cost-effective control mechanism for use in household and commercial appliances. It further is capable of real-time-based control, remote control and networking.

44 Claims, 10 Drawing Sheets

DIGITAL ELECTRONIC CONTROL UNIT

CROSS-REFERENCE TO RELATED APPLICATIONS

This is a continuation-in-part of international patent application PCT/IN99/00029, filed Jul. 5, 1999 and designating the United States of America, and of international patent application PCT/IN99/00031, filed Jul. 16, 1999 and designating the United States of America, and their specifications are incorporated herein in their entireties by this reference.

FIELD OF THE INVENTION

This invention relates to a digital electronic control unit that may include real-time clock-based control, remote control and networking capabilities for controlling the functions of domestic and commercial appliances such as washing machines, refrigerators, dishwashers, electric ovens, and the like.

BACKGROUND

Many modern appliances incorporate control elements that are common in the nature of their control action as well as the parameters that are controlled. For example, temperature control is a common requirement in several different appliances such as refrigerators, washing machines, dishwashers and electric ovens. Similarly, on-off control of fractional horsepower AC motors is also common to all the appliances mentioned above, besides many others. Timer based control is yet another of the common requirements in many appliances. These requirements extend to several different commercial appliances also.

The control mechanisms currently employed in each of these appliances are often widely different from each other. In addition, there are generally several different control mechanisms employed in each appliances, often as many as one separate control device for each controlled parameter, with each of the control devices being control device for each controlled parameter, with each of the control devices being wired together in a final circuit to perform the desired overall control function in a coordinated manner. This manner of implementation is inefficient and expensive when compared with the capabilities that emerge with the use of an integrated system of control in which the advantages offered by modem electronics technology are utilized to the fullest to provide an integrated, miniaturized implementation that is both cost-effective and efficient in terms of operation, implementation and energy consumption.

Some of the common parameters for control in appliances are:
1) Temperature
2) Liquid Level
3) On-Off control of fractional horse-power ac or dc motors.
4) Time sequences
5) Events—such as switch closures/openings.

In addition, some common requirements are:
1) Audio output (e.g. to alert users when attention is required).
2) Push-button/rotary adjustments of control parameters by the user.
3) Display of user-selections/events/parameter values by visual means—indicators or displays.

An implementation of the various control functions in single-chip form results in a flexible "electronic control element" that provides the maximum advantages of low-cost, small size, ease of implementation and high reliability. There are no known equivalent implementations available today.

Microcontroller-based implementations for some control parameters, such as temperature, are known. U.S. Pat. Nos. 4,158,759, 4,367,387, 4,399,352, 4,066,945, 4,431,893, 4,481,393, 4,504,716, 4,533,810, 4,367,387 and 4,504,716 disclose examples of such electronic controls for various appliances. These come close to realising some of the advantages but fall short in respect of optimal implementation of some of the common requirements, such as triac-firing control, a.c motor protection controls and interfaces to sensors. These requirements generally entail the incorporation of additional external circuitry and interfaces that dilute the effectiveness of the implementation.

Many modem control systems that are used for industrial or commercial applications incorporate the following features:
1) Real-time-clock (Time-of-day) based control actions.
2) Networking of various devices inorder to share resources or data, as well as to provide remote access to a device over the network.
3) Remote control using a hand-held remote control device.

The use of computers in control systems has further increased the need for such intercommunications. Finally, the rapid growth of the Internet and its fast expanding reach into offices and homes in the movement towards the "net-worked society" of the near future is expected to generate the demand for internetworking the various systems. These developments have led to the need for communication abilities even in the average devices of the home. It is therefore expected that domestic appliances would also require such capabilities.

Most designs of devices with such capabilities utilise microcomputers or microcontrollers as the key component for control. While this approach works very well, it is not the most cost-effective or efficient for many applications. In particular, the cost-sensitive, mass-volume application area of domestic appliances require special interface circuits, such as AC power switching devices, for which additional hardware is needed when using microcontrollers. This additional hardware can easily increase the cost and size of the control for the appliance very significantly. The use of special custom hardware provides a better solution, but existing designs of such custom hardware are very specialised to a particular application or appliance. Each appliance product therefore needs its own dedicated design of custom hardware.

The most desirable solution is one in which a specially-designed hardware suitable for the entire range of appliances, is configured for use in each specific product. Such a design would provide the flexibility of microprocessor-based designs at significantly lower cost and size.

SUMMARY OF THE INVENTION

The present invention relates to a digital electronic control unit that provides an efficient, miniature, reliable and cost effective control mechanism for use in appliances intended for household and commercial applications, such as washing machines, refrigerators, dishwashers, ovens, and the like. It further relates to a flexible, digital electronic control unit for use in domestic and commercial appliances, that provides the capabilities of real-time clock-based control, remote control and networking.

BRIEF DESCRIPTION OF THE DRAWINGS

The invention will now be described with reference to the accompanying drawings.

DETAILED DESCRIPTION OF EXEMPLARY EMBODIMENTS

Figure 1:
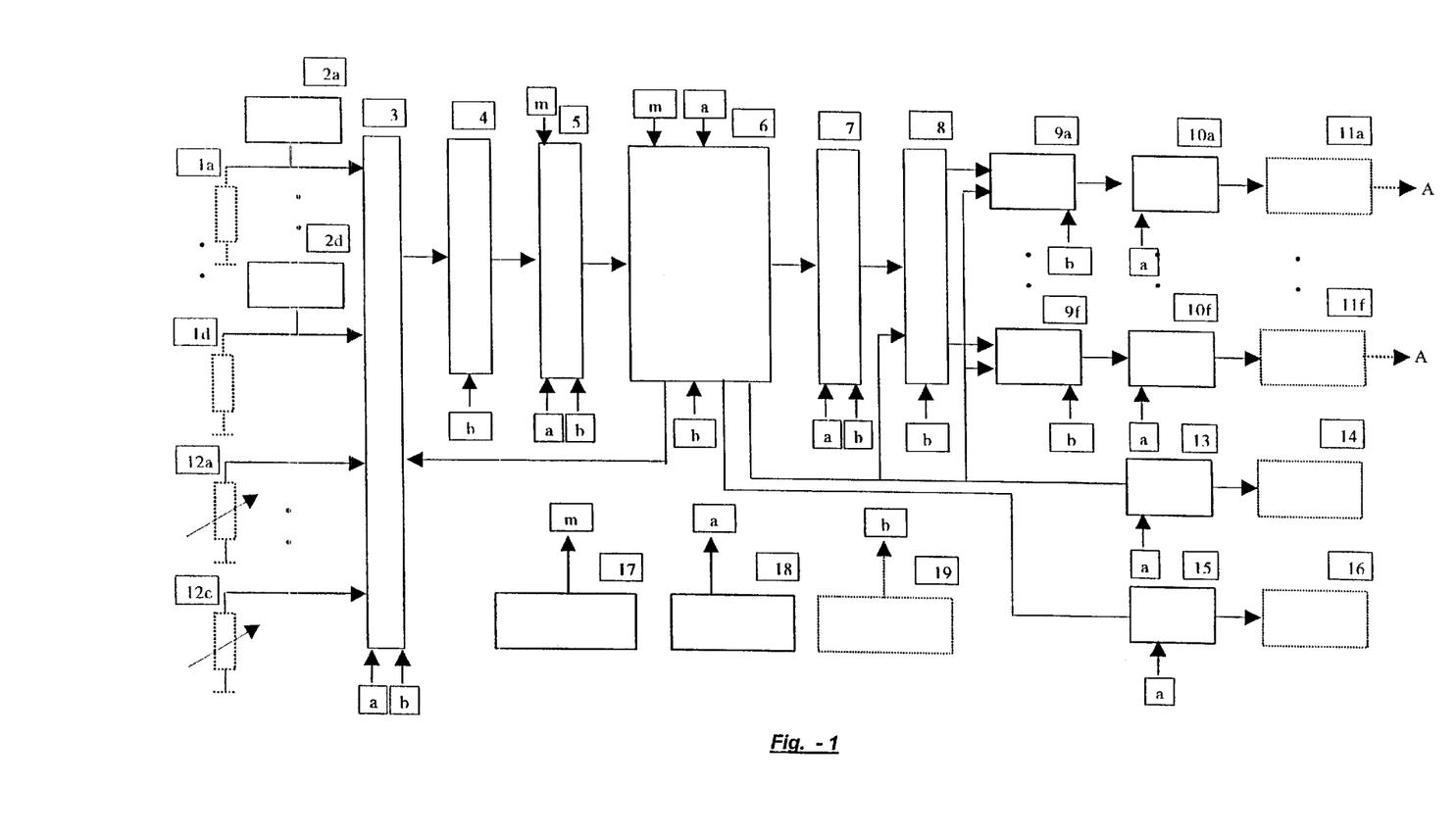
FIG. 1 shows an electronic control unit according to this invention, using potentiometers for providing user-variable input.

Referring to FIG. 1 of the drawings, items 1a–1d show the external sensing elements. Sensor drive circuits 2a–2d provide the bias signals for the sensors. Analog multiplexer 3 selects the signal from one of the sensing elements based on the selection data from the Central Control Unit 6 which is then converted to digital form by analog-to-digital converter 4. This digital output is adjusted for sensor linearity, offset and sensitivity by linearity, sensitivity and offset correction circuit 5 that receives the correction factor data in digital form from non-volatile memory 17. This corrected digital output is supplied to central control unit 6 which stores the data. User input is received by means of external potentiometers 12a–12c and is used by the central control unit 6 along with the stored digital data received from the linearity, sensitivity and offset correction circuit 5 to generate the control signal for correcting the sensed parameter. This control signal is passed through digital filter 7 to remove noise and then applied to the input of digital demultiplexer 8 which routes it to one of the control latches 9a–9f under the control of the central control unit 6. The output of each control latch is connected to an output drive and protection circuit 10a–10f. Each output drive and protection circuit drives an external switching device 11a–11f to actuate the relevant part of the appliance to correct the sensed parameter. Said central control unit 6 includes circuitry for defrost operation (not shown) and for start relay operation (not shown), if required for the appliance. The central control unit 6 drives a display drive unit 13 for displaying user input or sensed parameter value on an external display unit 14, and also an audio drive unit 15 for providing audio output through an external audio transducer 16. A Clock Circuit 18 and non-volatile-memory 17 are connected to various points in the circuit as indicated.

Figure 2:
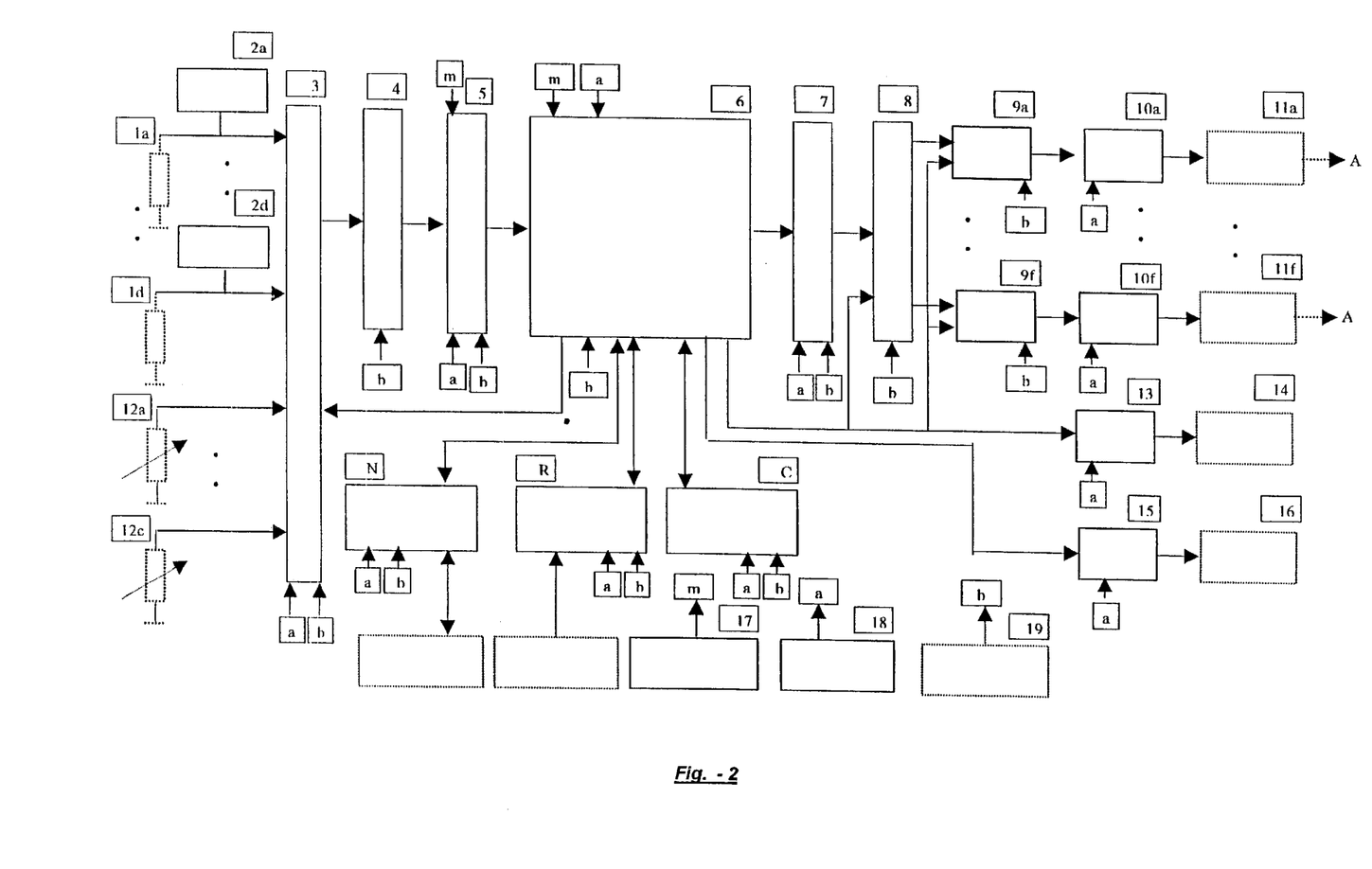
FIG. 2 shows a digital electronic control unit including real-time clock, remote control interface, and network interface, according to this invention, using potentiometers for providing user-variable input.

In FIG. 2, the central control unit 6 receives time-of-day data from real-time clock unit (C) which enables it to perform control actions based on time-of-day requirements. A remote-control interface unit (R) connected to said central control unit 6 provides the ability to receive user input data remotely form a hand-held remote control unit. A network interface unit (N) connects said central control unit 6 to external devices, which may be other similar digital control units or other devices such as computers, and enables the exchange of data between the various devices in the network. A Clock Circuit 18 and non-volatile-memory 17 are connected to various points in the circuit as indicated.

Figure 3:
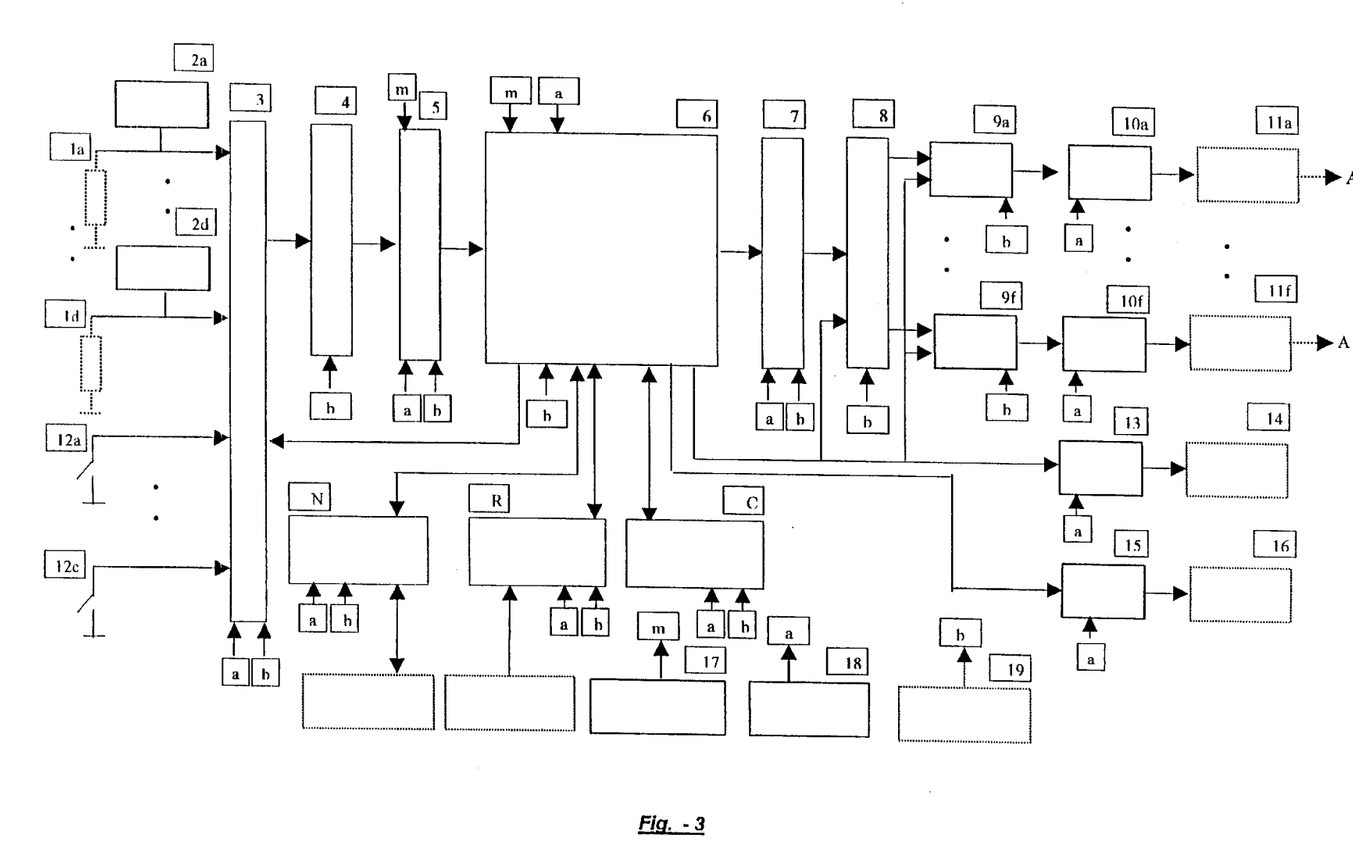
FIG. 3 shows an alternate embodiment of the unit, using switches for providing user-variable input.

In FIG. 3, the user variable inputs originate from external switches 20a–20c, instead of potentiometers.

Figure 4:
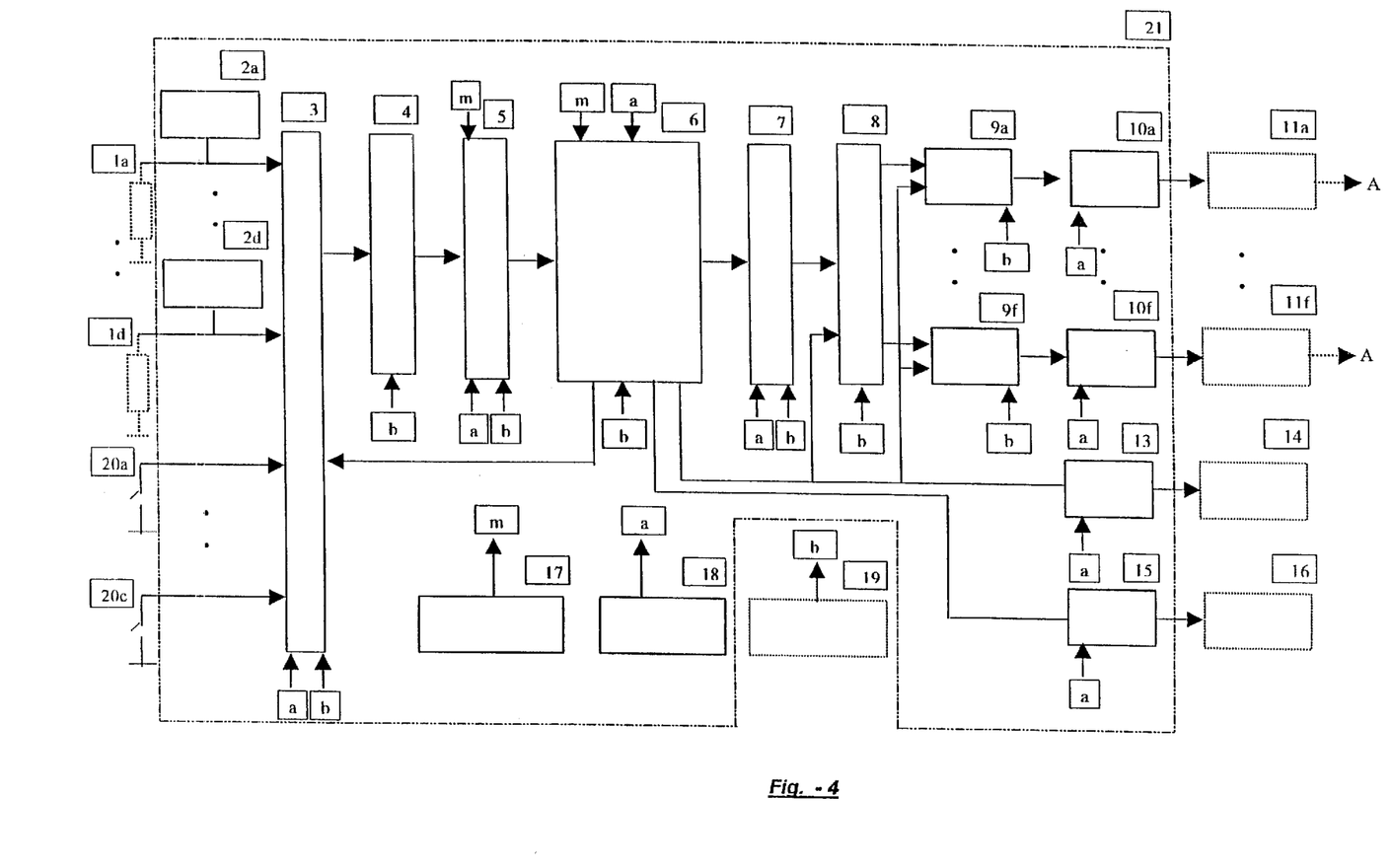
FIG. 4 shows an embodiment in which the entire electronic control circuit excepting the power supply, external sensing elements, user variable means and external switching devices, is implemented as an Application Specific Integrated Circuit (ASIC).

FIG. 4 shows an implementation of the electronic control unit excluding the external blocks 1a–1d, 11a–11f, 12a–12c, 14, 16, 19, and 20a–20c in the form of an Application Specific Integrated Circuit (ASIC) 21 to provide a solution that is both very miniature and cost-effective.

Figure 5:
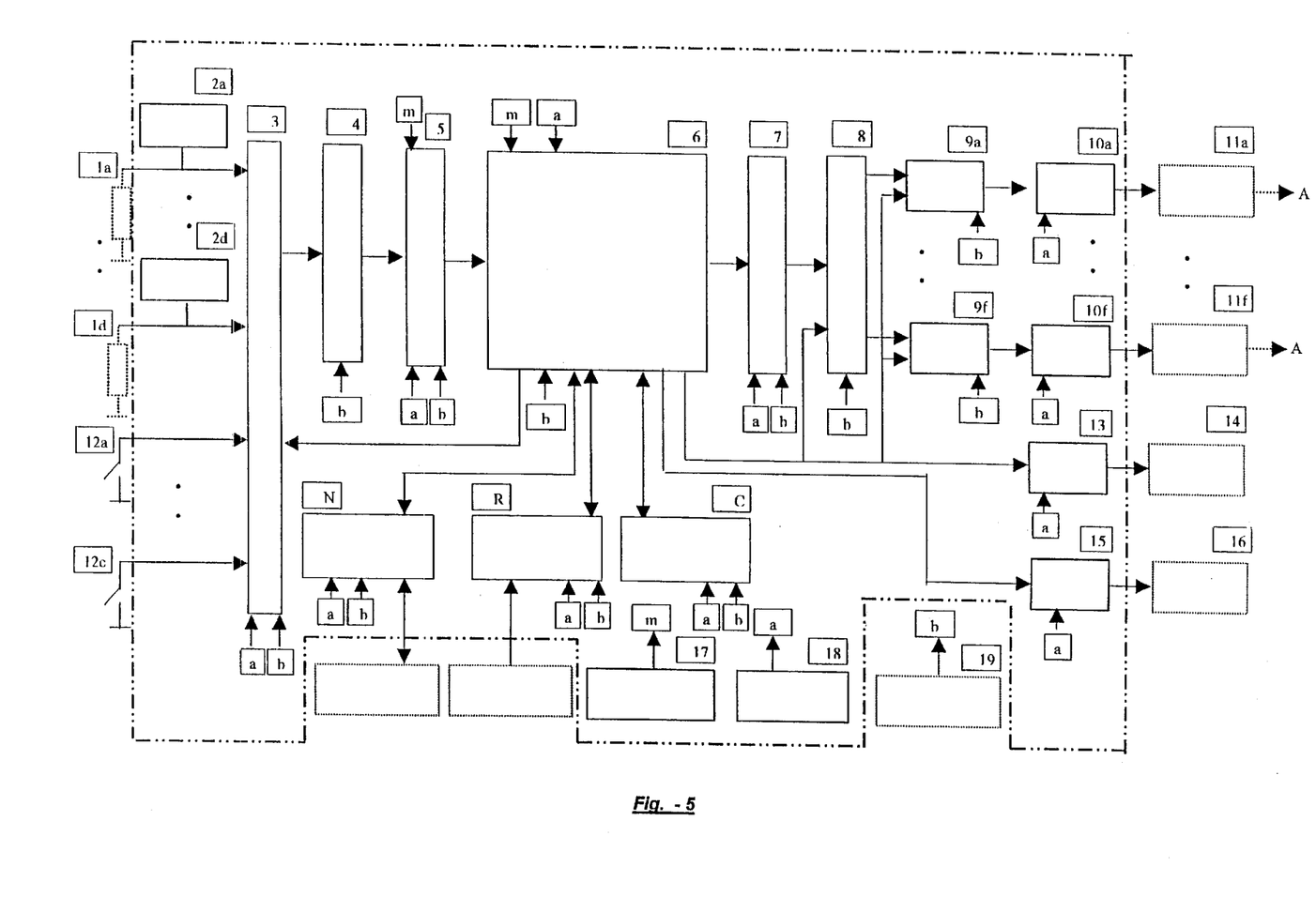
FIG. 5 shows an embodiment in which the entire digital electronic control circuit including the real-time clock, remote control interface unit and netwok interface unit except the power supply, external sensing elements, user variable means and external switching devices, is implemented as an Application Specific Integrated Circuit (ASIC).

FIG. 5 shows an implementation of the electronic control unit including the real-time clock, remote control interface unit and network interface unit except the power supply, external sensing elements, user variable means and excluding the external blocks 1a–1d, 11a–11f, 12a–12c, 14, 16, 19, and 20a–20c in the form of an Application Specific Integrated Circuit (ASIC) 22 to provide a solution that is both very miniature and cost-effective.

Figure 6:
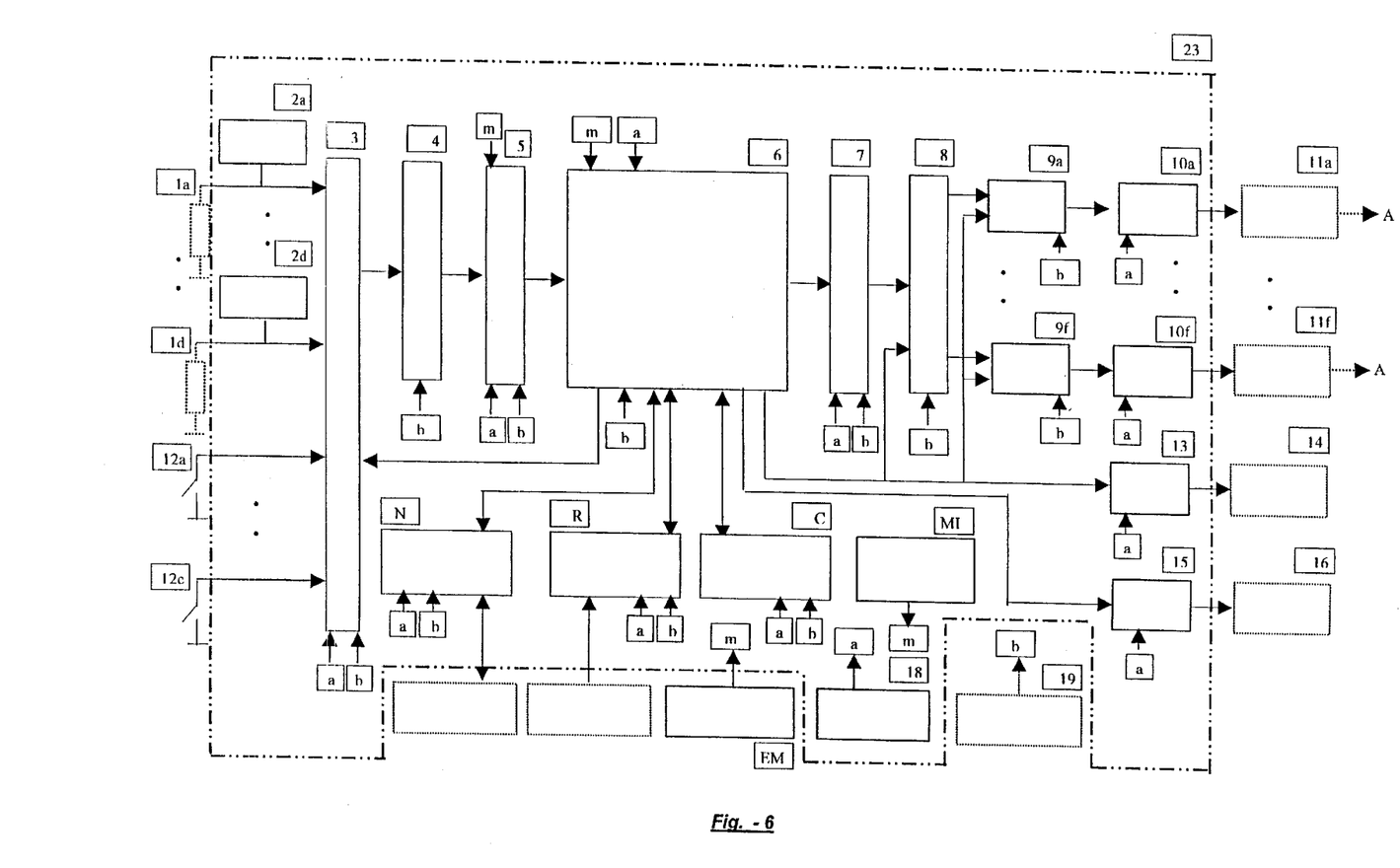
FIG. 6 shows an alternative embodiment in the form of a ASIC in which the non-volatile memory is also external to the ASIC. This facilitates the use of larger capacities of non-volatile memory.

FIG. 6 shows another embodiment using an ASIC 23 in which the non-volatile memory is external to the ASIC inorder to provide for larger storage capacity. A non-volatile memory interface block MI is provided in the ASIC for connecting to the external non-volatile memory EM.

Figure 7:
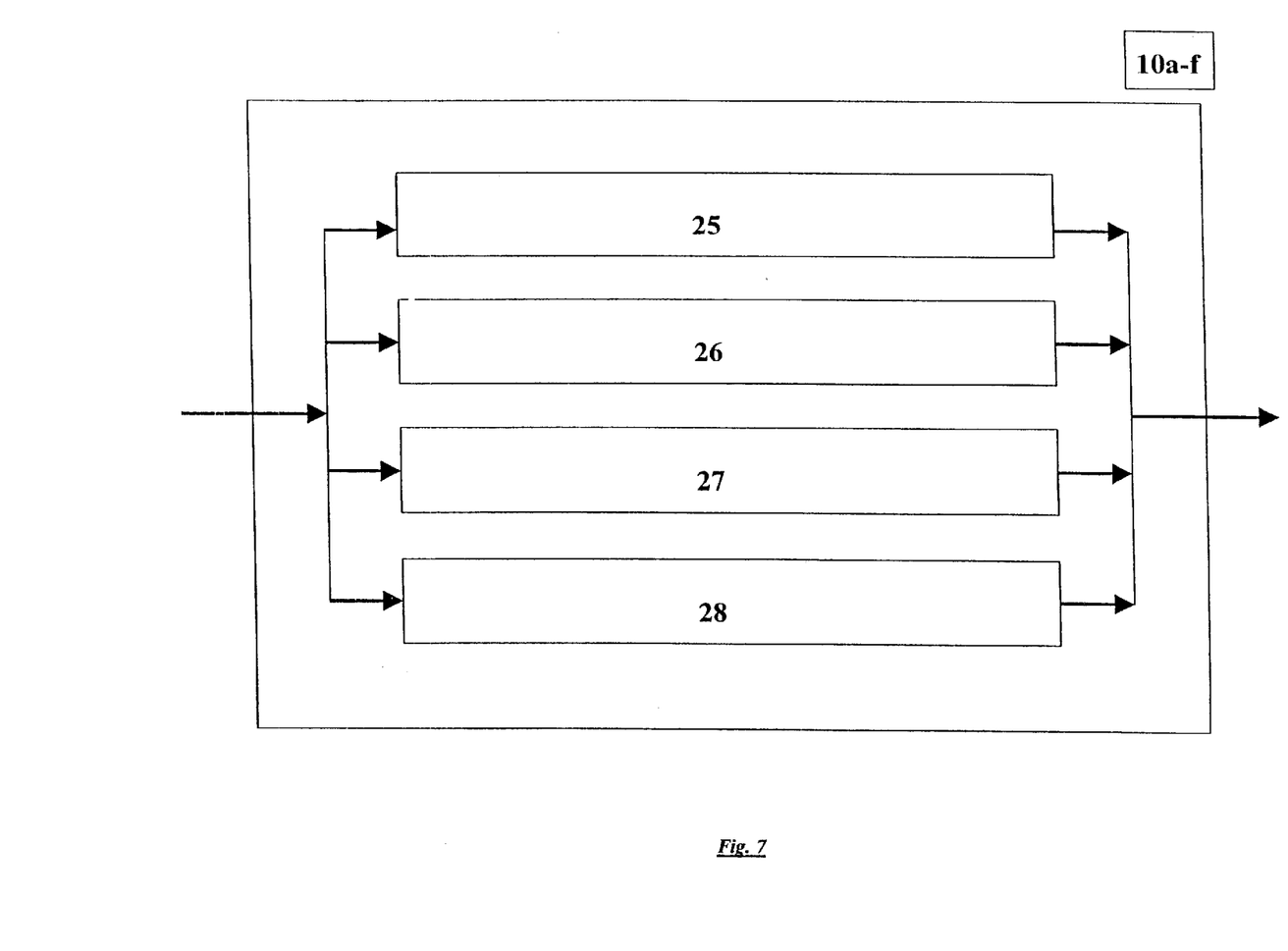
FIG. 7 shows the internal structure of the output drive and protection circuit.

FIG. 7 shows the internal structure of each output drive and protection circuit. Overcurrent protection 25, over-heat protection 26 and over-voltage protection 27 circuits inside each output drive and protection circuit monitor the electrical conditions at the output of each external switching device 11a–11f and limit or cut-off the drive to it in case of overload conditions. Additionally, a soft-start drive circuit 28 provides a gradual start-up drive signal inorder to minimise stress on the external switching device 11a–11f as well as the load (appliance).

Figure 8:
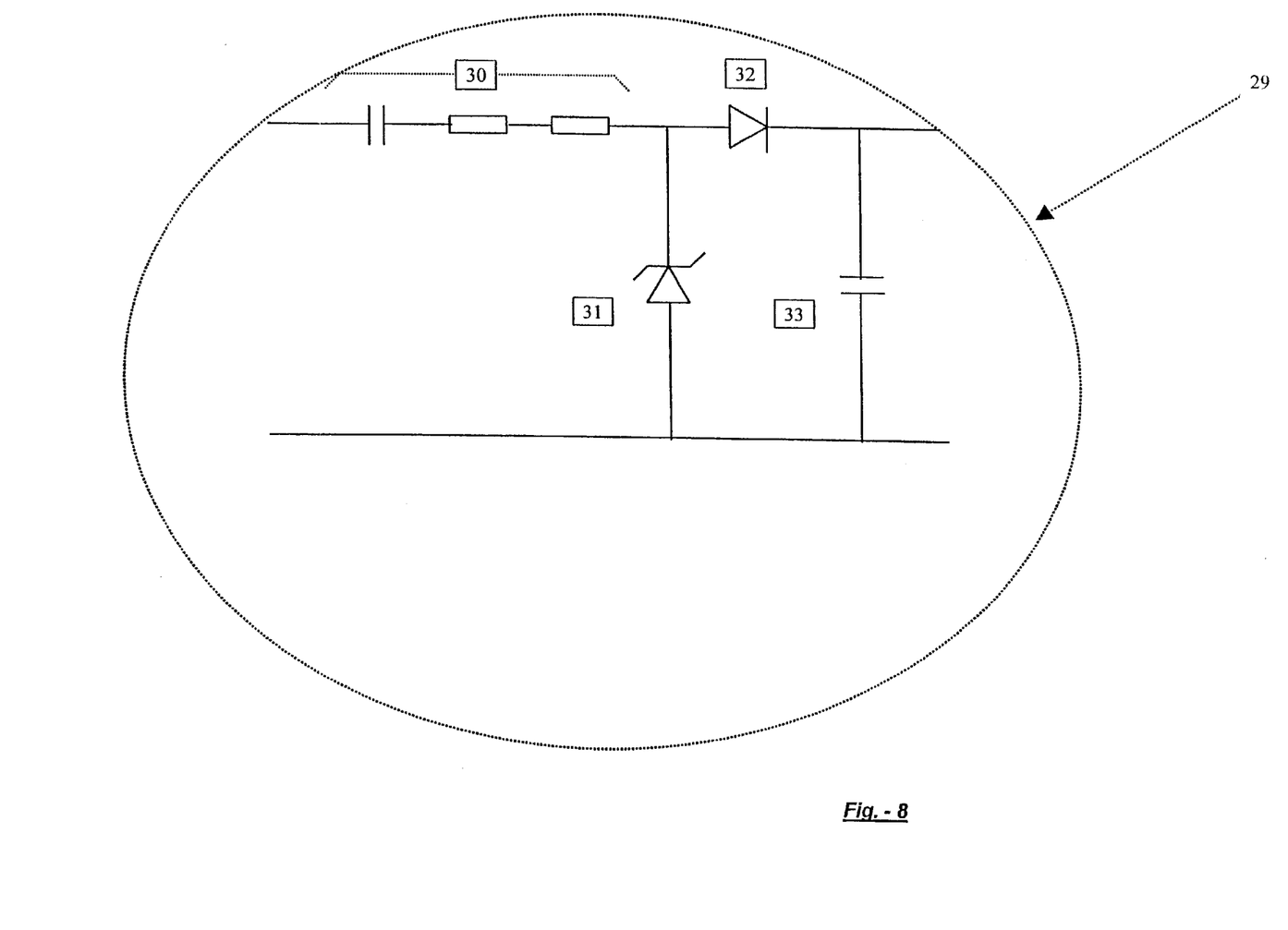
FIG. 8 shows the transformerless power-supply used to provide power to the electronic control unit.

FIG. 8 shows the transformerless power-supply 29 of 2 to 8 volts used to provide power to the digital electronic control unit. A capacitive voltage dropping network 30, with a voltage clamping zener diode 31 reduces the input high-voltage AC voltage to a low value. This low value AC voltage is then rectified and filtered by a diode 32 and then filtered by a capacitor 33 to produce a low voltage d.c. supply that feeds power to the circuit.

Figure 9:
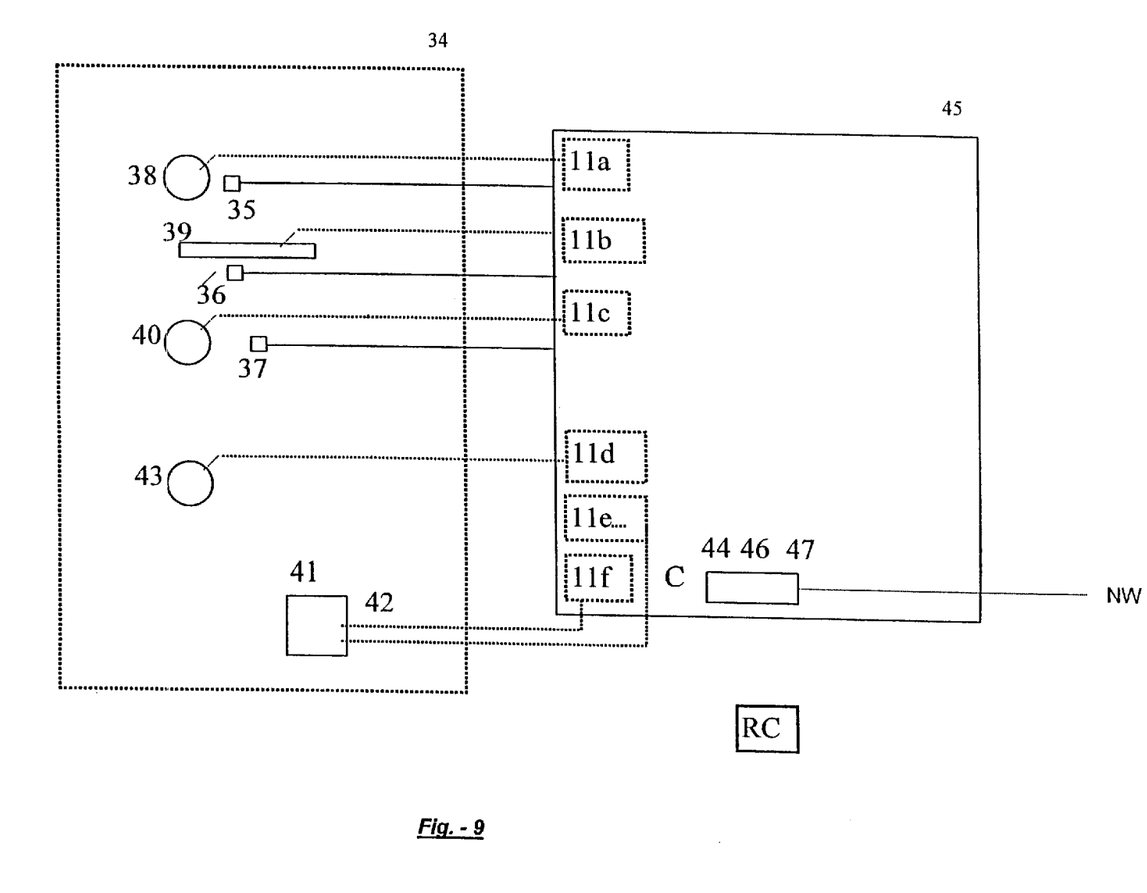
FIG. 9 shows an application of the electronic control unit in a washing machine.

FIG. 9 shows an application of the electronic contol unit in a washing machine 34. A water level sensing element 35 placed inside the wash tank senses the water level in the tank, a temeperature sensing element 36 inside the wash tank senses the temperature of the water while a detergent level sensing element 37 placed inside the detergent supply tank senses the detergent level. The water-fill valve 38, heating coil 39, detergent-fill valve 40, agitator motor 41, motorreversing switch 42 and water-drain valve 43 are controlled by the electronic control unit 45 based on the signals received from the various sensing elements and from the user setting switches 44. The status and user settings are displayed on the machines user-interface panel 46 and when required, alarms are annunciated on the audio unit 47.

If required, a handheld remote-control unit (RC) is also used to control the user settings and receive status information remotely. A real-time-clock (CL) on the front panel of the washing-machine displays time-of-day information and can be used to set control actions, e.g. turning-on or turning-off the washing-machine at programmed times during the day. A network (NW) connects the washing machine to other appliances in the home and to home computer (not shown), to provide computer controlled operation from within the home.

Figure 10:
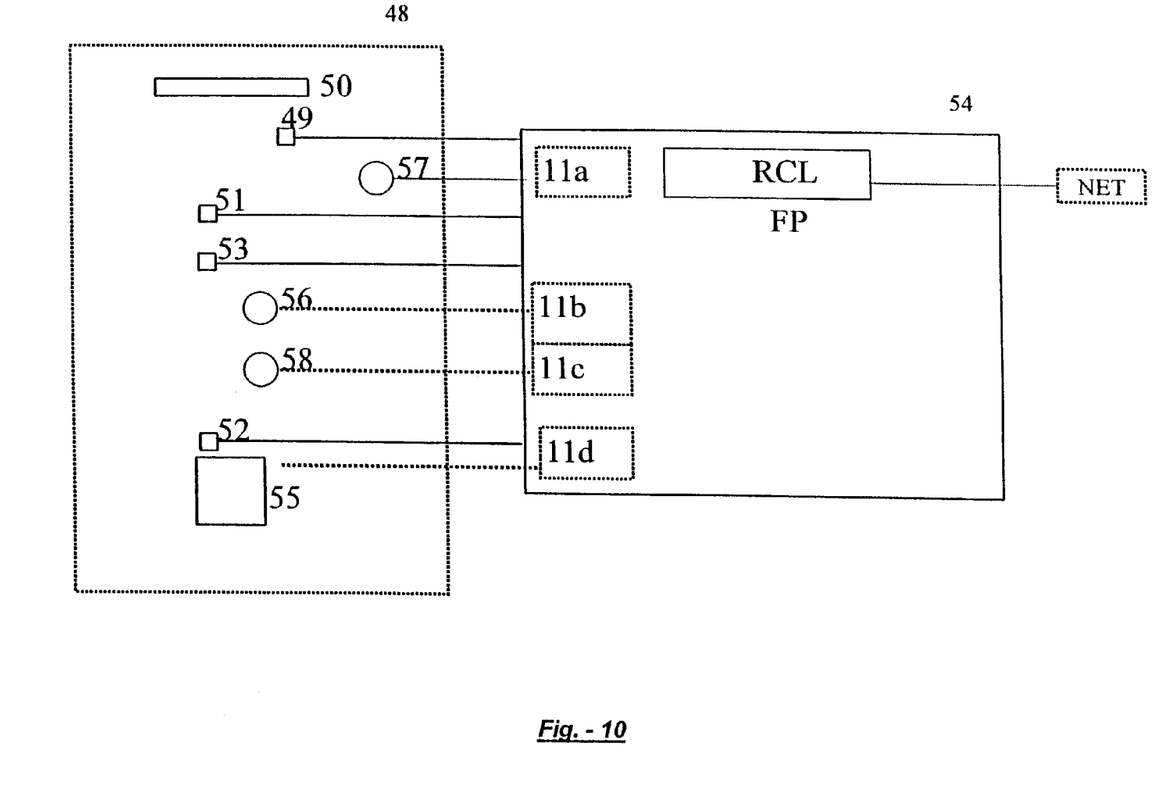
FIG. 10 shows an application of the electronic control unit in a refrigerator.

FIG. 10 shows an application of the electronic contol unit in a refrigerator 48. A temperature sensing element 49 placed inside the freezer compartment senses the temperature near the cooling coils 50, another temperature sensing element 51 placed inside the main compartment senses the temperature inside that compartment while a third temperature sensing element 52 senses the temperature of the compressor housing. A door switch 53 located on the door frame senses the open-close condition of the refrigerator's door. The digital electronic control unit 54 receives the signals from each of these sensing elements and operates the compressor unit 55, circulating fan 56, refrigerator light 57 and door-open alarm 58 based on the signals received from each of the sensing elements and switches.

If required, the refrigerator has a real-time-clock (RCL) display on the front-panel (FP) that is used to display the time-of-day as well as to define control actions at programmed times of day. The network interface inside the digital electronic control unit is also used to connect the refrigerator to a network (NET) in the home that connects the various appliances to a central home computer (not shown) for monitoring and control.

Sensing elements 1a–1d (which may be linear or non-linear transducers) are driven by sensor drive circuits 2a–2d and produce analog voltage signals in response to sensed parameters. These analog voltage signals are applied to the inputs of analog multiplexer 3. Analog multiplexer 3 outputs the signal from one of the sensing elements to analog-to-digital converter 4 under control of channel-select signals received from the central control unit 6. Analog-to-digital converter 4 produces a digital output that is the equivalent of the analog voltage supplied at its input. This digital output corresponding to the signal received from the selected sensing element, is received by linearity and sensitivity and offset correction circuit 5 and modified by it, using data stored in non-volatile memory 17 at the time of manufacture of the digital electronic control unit, to correct for non-linearities, offsets and sensitivity deviations in the sensing element's output. This produces a corrected, digital sensed parameter value. The central control unit and the linearity and sensitivity and offset correction circuit are digital logic circuits.

The corrected sensed parameter value is stored by the central control unit 6 which receives these values for each of the sensing elements. In addition, the central control unit 6 also receives user-supplied inputs from potentiometers 12a–12c or switches 20a–20c . The values of these inputs and the stored parameter values are evaluated by the central control unit 6 in accordance with control data that is supplied by the non-volatile memory 17. The result of the evaluation is in the form of a digital value that is output from the central control unit 6 to the input of the demultiplexer 7 alongwith selection signals that determine the output to which the result is routed. The sequence of evaluation is repeated for each output of the demultiplexer in a repetitive manner.

The central control unit 6 also includes circuitry for defrost operation and start relay operation, if required for the appliance.

In addition, the central control unit 6 also outputs digital signals for driving the display drive unit 13 and audio drive unit 15 in accordance with control data supplied by non-volatile memory 17.

The output from the demultiplexer is stored in one of the control latches 9a–9f based on the selection control signals generated by the central control unit 6, and is used to enable/disable the corresponding output drive and protection circuit 10a–10f. Each output drive and protection circuit 10a–10f when enabled by its corresponding control latch 9a–9f generates the signals necessary to drive the external switching device 11a–11f inorder to actuate the relevant part of the appliance to correct the sensed parameter. The output drive and protection circuit 10a–10f also monitors the load conditions continuously and deactivates the drive to the external switching device 11a–11f if overload conditions are encountered.

A Clock Circuit 16 based on a quartz crystal oscillator in the 32 KHz–25 MHz frequency range generates all the timing signals necessary to operate each circuit block while a Power Supply 18 supplies the necessary voltage and current to each circuit block of the electronic control unit.

A real time clock unit (C) provides time-of-day input to the central control unit 6 for enabling control actions based on time-of-day values. A remote control interface unit R connected to said central contrl unit 6 makes it possible for the user to input data remotely, instead of from the front panel of the digital control unit, with the help of a hand-held remote control device, which may be an infrared, ultrasonic or radio-frequency remote control transceiver. A network interface unit (N) connected to said central control unit 6 provides the facility to connect the digital control unit to other devices, such as other similar digital control units or computers, inorder to exchange information.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A digital electronic control unit for an appliance, comprising:
    a plurality of sensor drive circuits, each driving one of a plurality of sensing elements external to said digital electronic control unit, each sensing element converting a sensed parameter to an electrical signal;
    an analog multiplexer that receives the electrical signal from each external sensing element and selectively routes a selected electrical signal to a multiplexer output;
    an analog-to-digital converter connected to the output of said analog multiplexer and converting the selected electrical signal to digital values;
    a linearity, sensitivity and offset correction circuit connected to the output of said analog-to-digital converter for correcting the digital values received from it, using sensor calibration data stored in a non-volatile memory;

a central control unit that receives corrected output from said linearity, sensitivity and offset correction circuit, and generates control signals for operating the appliance, as well as selection signals for controlling said analog multiplexer, using control data supplied by the non-volatile memory;

a digital de-multiplexer connected to an output of said central control unit for selecting one of a plurality of de-multiplexer outputs to which a de-multiplexer input coupled to said central control unit is to be connected;

a plurality of control latches, each connected at one of said de-multiplexer outputs, for storing the digital data received from it and actuating a part of the appliance to adjust the sensed parameter;

a non-volatile memory that stores data and control parameters for the operation of said central control unit, linearity, sensitivity and offset correction circuit.

2. A digital electronic control unit as claimed in claim 1, further comprising a digital noise filter connected to an output of said central control unit for eliminating spurious signals.

3. A digital electronic control unit as claimed in claim 1, further comprising a clock oscillator that provides timing signals for operating circuits of the digital electronic control unit.

4. A digital electronic control unit as claimed in claim 3, wherein said clock oscillator operates at a frequency between approximately 32 KHz and approximately 25 MHz.

5. A digital electronic control unit as claimed in claim 4, wherein the clock oscillator operates at a frequency of 4 MHz.

6. A digital electronic control unit as claimed in claim 1, wherein said sensing elements are linear or non-linear transducers.

7. A digital electronic control unit as claimed in claim 1, wherein said central control unit and said linearity, sensitivity and offset correction circuits are digital logical circuits.

8. A digital electronic control unit as claimed in claim 1, wherein said appliance is a refrigerator and said central control unit includes defrost operation circuits.

9. A digital electronic control unit as claimed in claim 1, wherein said appliance has a single-phase AC motor and said central control unit includes motor start relay circuitry.

10. A digital electronic control unit as claimed in claim 1, wherein the output of each of said control latches is connected to an output drive and protection circuit to drive a switching device to actuate a part of the appliance to adjust the sensed parameter.

11. A digital electronic control unit as claimed in claim 1, a plurality of user input means that are connected to said central control unit through said analog multiplexer, analog-to-digital converter, and linearity, sensitivity and offset correction circuits to provide user-defined inputs and selections for defining desired values of the control parameters.

12. A digital electronic control unit as claimed in claim 1, wherein the user variable means are selected from the group consisting of potentiometers and switches.

13. A digital electronic control unit as claimed in claim 1, further comprising a display drive unit connected to an output of said central control unit for selectively displaying a selected one of the sensed parameter and the user-specified value from the user input means on an external display device.

14. A digital electronic control unit as claimed in claim 1, further comprising an audio drive unit connected to an output of said central control unit for generating audio signals for alerting a user via an audio transducer external to said digital electronic control unit.

15. A digital electronic control unit as claimed in claim 1, further comprising a power supply for powering circuitry of the digital electronic control unit, said power supply including a low-loss capacitive voltage dropping network coupled to a voltage clamping device, a rectifier and a filter network to provide a DC voltage.

16. A digital electronic control unit as claimed in claim 1, where in the entire digital electronic control unit except power supply, sensing elements, user variable means and external switching devices, is implemented as a custom Application Specific Integrated Circuit (ASIC).

17. A digital electronic control unit as claimed in claim 16, wherein the ASIC excludes non-volatile memory but includes a memory interface block for connecting to non-volatile memory external to said digital electronic control unit.

18. A digital electronic control unit as claimed in claim 1, further comprising an output drive and protection circuit having a thermal protection circuit, an over-current protection circuit, over-voltage protection circuit and a soft-start circuit for providing an effective reduced-voltage start-up to a load during an initial period of turn-on.

19. A digital electronic control unit as claimed in claim 1, wherein said appliance is a washing machine.

20. A digital electronic control unit as claimed in claim 1, wherein said appliance is a refrigerator.

21. A digital electronic control unit for an appliance, comprising:

a plurality of sensor drive circuits, each driving one of a plurality of sensing elements external to said digital electronic control unit, each sensing element converting a sensed parameter to an electrical signal;

an analog multiplexer that receives the electrical signal from each external sensing element and selectively routes a selected electrical signal to a multiplexer output;

an analog-to-digital converter connected to said multiplexer output and converting the selected electrical signal to digital values;

a linearity, sensitivity and offset correction circuit connected to the output of said analog-to-digital converter for correcting the digital values received from it, using sensor calibration data stored in a non-volatile memory;

a central control unit receiving the corrected output from said linearity, sensitivity and offset correction circuit, and generating control signals for operating the appliance, as well as selection signals for controlling said analog multiplexer, using control data supplied by the non-volatile memory;

a digital de-multiplexer connected to an output of said central control unit for selecting one of a plurality of de-multiplexer outputs to which a de-multiplexer input coupled to said central control unit is to be connected;

a plurality of control latches, each connected at one output of said digital de-multiplexer, for storing the digital data received from it and actuating a part of the appliance to adjust the sensed parameter;

a non-volatile memory storing the data and control parameters required for the operation of said central control unit and said linearity, sensitivity and offset correction circuit; and an input of said central control unit is further connected to a device selected from the group consisting of:

a real-time clock providing time-of-day data, a remote control interface unit receiving user input and providing responses to the user from/to a remote control device, and a network interface unit providing bidirectional transfer of data between the digital control unit and other devices external to said digital electronic control unit.

22. A digital electronic control unit as claimed in claim 21, further comprising a digital noise filter connected to an output of said central control unit for eliminating spurious signals.

23. A digital electronic control unit as claimed in claim 21, further comprising a clock oscillator that provides timing signals operating circuits of the digital electronic control unit.

24. A digital electronic control unit as claimed in claim 21, wherein said remote control interface unit is of a type selected from the group consisting of: infra-red, ultrasonic and radio-frequency.

25. A digital electronic control unit as claimed in claim 21, wherein said remote control interface unit is a radio-frequency remote interface unit.

26. A digital electronic control unit as claimed in claim 21, wherein said remote control interface unit is an ultrasonic remote interface unit.

27. A digital electronic control unit as claimed in claim 21, wherein said network interface unit conforms to Transport Control Protocol/Internet Protocol (TCP/IP) standard.

28. A digital electronic control unit as claimed in claim 21, wherein said network interface unit conforms to Controller Area Network (CAN) Bus standard.

29. A digital electronic control unit as claimed in claim 21, wherein said network interface unit is interfaceable to a cable network.

30. A digital electronic control unit as claimed in claim 21, wherein said sensing element are transducers of a type selected from the group consisting of linear and non-linear.

31. A digital electronic control unit as claimed in claim 21, wherein said central control unit and said linearity offset and sensitivity correction circuit are digital logical circuits.

32. A digital electronic control unit as claimed in claim 21, wherein the output of each of said control latches is connected to an output drive and protection circuit to drive a switching device to actuate the necessary part of the appliance in order to correct the sensed parameter.

33. A digital electronic control unit as claimed in claim 21, further comprising a plurality of user input means connected to said central control unit through said analog multiplexer, analog-to-digital converter, and linearity, sensitivity and offset correction circuit to provide user-defined inputs and selections for defining desired values of the control parameters.

34. A digital electronic control unit as claimed in claim 21, wherein the user variable means are selected from the group consisting of potentiometers and switches.

35. A digital electronic control unit as claimed in claim 21, further comprising a display drive unit connected to an output of said central control unit for selectively displaying a selected one of the sensed parameter and a user-specified value from the user input means on a display device external to said digital electronic control unit.

36. A digital electronic control unit as claimed in claim 21, further comprising an audio drive unit connected to an output of said central control unit for generating audio signals for alerting a user via an audio transducer external to said digital electronic control unit.

37. A digital electronic control unit as claimed in claim 21, further comprising a power supply for powering the digital electronic control unit having a low loss capacitive voltage-dropping network coupled to a voltage clamping device, a rectifier and a filter network to provide a DC voltage.

38. A digital electronic control unit as claimed in claim 21, wherein the entire digital electronic control unit including the real-time clock, remote control interface unit and netwok interface unit except power supply, sensing elements, user variable means and external switching devices, is implemented as a custom Application Specific Integrated Circuit (ASIC).

39. A digital electronic control unit as claimed in claim 38, wherein the ASIC excludes non-volatile memory but includes a memory interface block for connecting to non-volatile memory external to said digital electronic control unit.

40. A digital electronic control unit as claimed in claim 21, wherein said output drive and protection circuit includes a thermal protection circuit, an over-current protection circuit, over-voltage protection circuit and a soft-start circuit for providing an effective reduced-voltage start-up to a load during an initial period of turn-on.

41. A digital electronic control unit as claimed in claim 21, wherein said clock oscillator operates at a frequency in a range between approximately 32 KHz and approximately 25 MHz.

42. A digital electronic control unit as claimed in claim 41, wherein said clock oscillator operates at a frequency of 4 MHz.

43. A digital electronic control unit as claimed in claim 21, wherein said appliance is a washing machine.

44. A digital electronic control unit as claimed in claim 21, wherein said appliance is a refrigerator.

* * * * *